United States Patent [19]

Buchalla

[11] 4,019,788
[45] Apr. 26, 1977

[54] SEALING DEVICE

[75] Inventor: Artur Buchalla, Bobingen, Germany

[73] Assignee: Hoechst Aktiengesellschaft, Frankfurt am Main, Germany

[22] Filed: Apr. 21, 1975

[21] Appl. No.: 570,226

[30] Foreign Application Priority Data

Feb. 13, 1975 Germany .......................... 2506091

[52] U.S. Cl. ........................................... 308/187.1
[51] Int. Cl.² ........................................ F16C 33/76
[58] Field of Search ............. 308/187.1, 187, 187.2

[56] References Cited

UNITED STATES PATENTS 3,924,911 12/1975 Bumberger ..................... 308/187.1

Primary Examiner—Joseph F. Peters, Jr.
Assistant Examiner—Richard A. Bertsch
Attorney, Agent, or Firm—Connolly and Hutz

[57] ABSTRACT

The invention provides an improved end-face sealing device between rotating pairs of rolls and stationary chambers of an apparatus by means of sealing elements fitted in the end-faces of the rolls and sealing plates fitted in the side walls of the chambers in such a manner that they are pressed on the said sealing elements, the sealing elements being adjustably mounted on stationary parts of said apparatus without use of bearing elements. The device is especially suitable for sealing off against solids containing liquids to be squeezed off.

3 Claims, 1 Drawing Figure

U.S. Patent   April 26, 1977   4,019,788
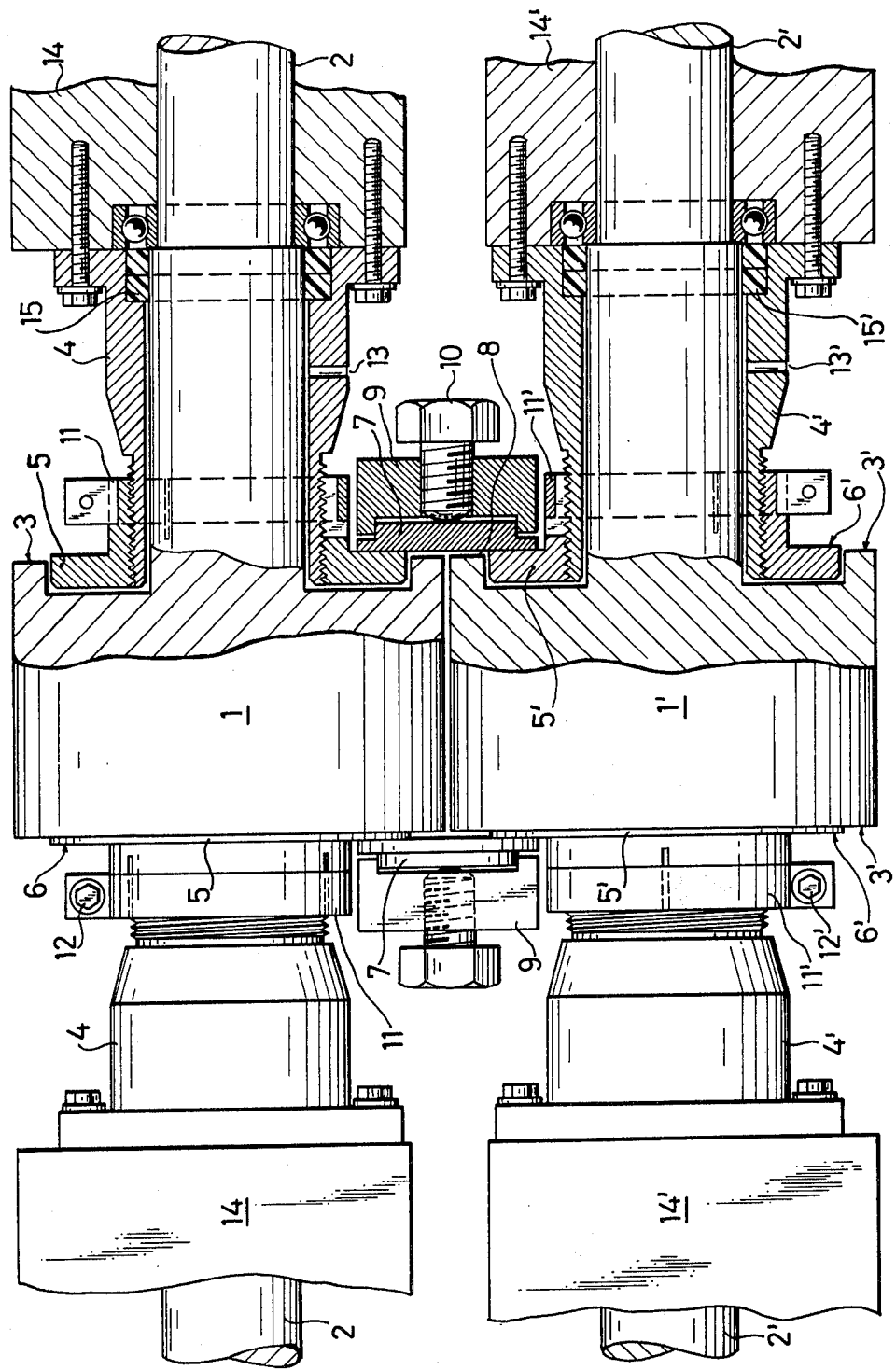

SEALING DEVICE

The present invention concerns an end face sealing device between a pair of rolls and a stationary chamber. A sealing device of this kind is especially suitable for closing off a pair of pull-in rolls from the stationary walls of upset-crimping apparatus for crimping, for example, high-polymer filaments in the form of ropes.

Copending application Ser. No. 478,221 filed June 11, 1974 by Dietrich Bumberger now U.S. Pat. No. 3,924,911, issued Dec. 9, 1975 provides an end-face sealing device between, on the one hand, rotating pairs of rolls and, on the other, stationary chambers, which comprises a. sealing elements fitted in the end-faces of the rolls, being adjustable in the axial direction of the rolls and prevented from turning with the rolls,
  b. sealing plates fitted in the side walls of the chambers in such a manner that they are pressed on the said sealing elements, and
  c. devices for pressing said sealing plates on the said sealing elements.

The aforesaid device is especially suitable for closing off a pair of pull-in rolls from the stationary walls of upset-crimping apparatus for crimping, for example, high-polymer filaments, in the form of a rope, provided that the rope does not entrain a liquid which can be squeezed out.

If, however, a liquid is squeezed off the bearing elements, for example suitable ball bearing, are subject to increased corrosion. This danger cannot be eliminated in reliable manner even if additional packings, for example lip-shaped gaskets or the like, were used for the protection of the said bearing elements, especially when solids are present besides the liquid causing a higher wear of the additional packings.

It is the object of the present invention to provide an end-face sealing device between a rotating pair of rolls and a stationary chamber in which corrosion-sensitive bearing elements can be dispensed with.

In the sealing device according to the invention the position of the sealing plates relative to the end-faces of the pair of rolls is fixed with the aid of adjustable sealing elements which are fastened, for example on the bearing blocks, by means of supporting bodies. The stationary position of the sealing elements in respect to the position of the respective shaft of the pair of rolls can also be secured by any other known adjustable fixing means. For example, adjusting screws can be used by which the position of the sealing elements, for example in respect to the machine housing, is fixed. With such an arrangement the bearing elements in the end-faces of the rolls can be dispensed with. If desired, appropriate known sealing elements, for example lip-shaped packings, can be fitted between the adjustable sealing elements or their supporting bodies and the bearings of the shafts of the rolls. In the case of minor leakages and when the emerging liquid can be rejected, the supporting bodies are simply provided with leakage bores in order to prevent the liquid from penetrating into the bearing elements of the shafts in the bearing block.

The invention will now be described by reference to an example of one form of construction illustrated in the accompanying drawing.

The drawing shows, partly in section, a stufferbox crimping apparatus, the sectional part being drawn on the plane that includes the axes of both pull-in rolls, the pull-in gap thus being seen as a line of contact between the two rolls. The shafts 2 and 2' of the rolls 1 and 1' respectively are parallel to each other, and one of the two shafts can usually be displaced. The roll mounted on the displaceable shaft is pressed by the usual pressure-applying means onto the second pull-in roll firmly mounted on the machine frame. The two rolls move the textile material which is to be crimped and which is usually in the form of a rope of synthetic filaments, and pass it into the stufferbox chamber, not shown in the drawing, disposed downstream of the rolls. The pull-in rolls 1 and 1', respectively, are machined and mounted with such a precision that their end-faces 3 and 3' lie in the same plane.

The bearing blocks 14 and 14' carrying the shafts 2 and 2' are provided with supporting bodies 4 and 4' serving to fix sealing elements 5 and 5' in a firm but adjustable manner. The said sealing elements 5 and 5' have precisely machined end-faces 6 and 6', which form a plane with a corresponding adjustment. A sealing plate 7 is pressed against the end-faces 6 and 6'. In the drawing the sealing plate 7, which is inserted in the lateral part 9 of the stufferbox crimping apparatus, is pressed against the end-faces 6 and 6' of the ring-shaped sealing elements by a screw 10. For the functioning of the sealing device in accordance with the invention it is immaterial by which means (spring, hydraulic or the like) the sealing plate 7 is pressed on, since the position of the sealing plate relative to the plane of the end-faces 3 and 3' is positively established by the ring-shaped sealing elements 5 and 5'.

The exact function of the device decisively depends on the distance of the plane formed by the end-faces 3 and 3' from the plane formed by the end-faces 6 and 6'. This distance determines the sealing gap between the sealing plate 7 and the end-faces 3 and 3' of the pair of pull-in rolls. In the drawing the said gap is marked by numeral 8.

The size of the sealing gap 8 can be adjusted by the position of the sealing elements 5 and 5'. In the drawing, the sealing elements 5 and 5' are fixed in their position simply by a thread over which they are connected with supporting bodies 4 and 4'. By simply turning sealing elements 5 and 5' their position can be exactly adjusted. To fix the said elements in the adjusted position fastening means are provided for. In the drawing, fastening of the sealing elements 5 and 5' is ensured by a clamping ring 11 or 11' which presses together the sealing elements 5 and 5' provided with several slits by a screw 12 or 12' and thus hinder them from changing their position. Leakage liquid, if any, may flow off through a leakage borehole 13 or 13', so that it does not constitute any danger for the bearing elements in the bearing blocks. In order to prevent lubricant from the bearing block from penetrating into the proper sealing of the pair of rolls a suitable sealing of the shafts on the bearing blocks is necessary. In the drawing corresponding packings are designated by numerals 15 and 15'.

The advantages of the device according to the invention are as follows; Whereas in previously proposed stufferbox crimping apparatuses the distance between the sealing plates 7 and the end-faces 3 and 3' has to be readjusted in a subjective manner each time the plates are changed, i.e. the sealing plate is pressed towards the plane of the end faces 3 and 3' with more or less force, all that is now required is a once and for all alignement of the end-faces 6 and 6' of the annular sealing elements with the plane of the end faces 3 and 3' before putting the apparatus into operation. This distance is maintained in reproducible manner each time the sealing plates are changed and is absolutely independent of the pressure by which the sealing plate is applied to the sealing elements and of the thickness of this plate. The improvement achieved by this invention resides in the fact that no bearing elements are necessary in the end-faces of the rolls which could corrode under the action of liquids.

If the apparatus is to be used at a temperature which is different from room temperature the once and for all adjustment of the sealing elements 5 and 5' should be made at the chosen operating temperature. In this manner a displacement, caused by temperature variation, of the plane of the end-faces of the pair of rolls 3 and 3' with respect to the plane of the end-faces 6 and 6' can be compensated.

The sealing plates can be made of a soft or a hard material as no chafing of the end faces 3 and 3' of the rolls on sealing plate 7 does occur. In the apparatus according to this invention the sealing plates are very easy to exchange and only a fraction of the assembling time hitherto required is necessary since the plates need not be adjusted.

What is claimed is:

1. An end-face sealing device between rotating pairs of rolls supported by bearing blocks and stationary chambers of an apparatus, comprising sealing elements fitted in the end-faces of the rolls and sealing plates fitted in the side walls of the chambers in such a manner that they are pressed on the sealing elements, the improvement being characterized by means to mount the sealing elements in adjustable manner on parts of the apparatus which do not rotate and are stationary in relation to the shaft of the respective roll, the sealing elements being adjustably connected with the non rotating parts by means of supporting bodies, the stationary parts of the apparatus being the bearing blocks of the shafts, the supporting bodies being tubes surrounding the shafts of the rolls, the sealing elements having the shape of flanges, and screw threads adjustably connecting the flanges with the supporting bodies.

2. An end-face sealing device as set forth in claim 1 wherein a clamping ring secures the flanges to the supporting tubes to hold them in the relative positions adjusted by the screw threads.

3. An end-face sealing device as set forth in claim 1 wherein leakage holes are provided in lower portions of the supporting tubes to prevent any liquid within the tubes from contacting the bearings in the bearing blocks.

* * * * *